United States Patent [19]

Brown et al.

[11] 4,342,082
[45] Jul. 27, 1982

[54] PROGRAM INSTRUCTION MECHANISM FOR SHORTENED RECURSIVE HANDLING OF INTERRUPTIONS

[75] Inventors: Paul J. Brown, Poughkeepsie; Robert J. Dugan, Hyde Park; Richard R. Guyette, Hopewell Junction, all of N.Y.; David L. Strong, San Jose, Calif.

[73] Assignee: International Business Machines Corp., Armonk, N.Y.

[21] Appl. No.: 104,930

[22] Filed: Dec. 18, 1979

Related U.S. Application Data

[63] Continuation of Ser. No. 759,164, Jan. 13, 1977.

[51] Int. Cl.[3] .......................... G06F 9/46; G06F 9/00
[52] U.S. Cl. ................................. 364/200; 364/300
[58] Field of Search ... 364/200 MS File, 900 MS File, 364/300

[56] References Cited

U.S. PATENT DOCUMENTS

| 3,017,092 | 1/1962 | Rent et al. | 364/200 |
|---|---|---|---|
| 3,286,236 | 11/1966 | Logan et al. | 364/200 |
| 3,373,408 | 3/1968 | Ling | 364/200 |
| 3,594,732 | 7/1971 | Mendelson et al. | 364/200 |
| 3,599,176 | 8/1971 | Cordero, Jr. | 364/200 |
| 3,614,740 | 10/1971 | Delagi | 364/200 |
| 3,728,693 | 4/1973 | Macker et al. | 364/200 |
| 3,771,146 | 11/1973 | Cotton et al. | 364/200 |
| 3,774,163 | 11/1973 | Recoque | 364/200 |
| 3,789,365 | 1/1974 | Jen et al. | 364/200 |
| 3,825,902 | 7/1974 | Brown et al. | 364/200 |
| 3,828,327 | 8/1974 | Bergluno et al. | 364/200 |
| 4,047,161 | 9/1977 | Davis | 364/200 |

OTHER PUBLICATIONS

Grant et al., "Priority Interrupt Queuing" in *IBM Tech. Disc. Bull.*, vol. 15, No. 10, Mar. 1973, pp. 3046-3048.

*Primary Examiner*—James D. Thomas
*Assistant Examiner*—Eddie D. Chan
*Attorney, Agent, or Firm*—W. S. Robertson

[57] ABSTRACT

Program instruction TPI (Test Pending Interruption) and associated data processor sequence controls for its execution enable interruption handling programs to operate in a shortened recursive mode relative to interruptions pending while such programs are in control of a data processor system. Execution of a TPI instruction sets a condition code distinguishing between pendency and non-pendency of a request for interruption in one associated class of interruptions. If an interruption request in that class is pending, the instruction execution controls clear (terminate) it. If more than one request is pending, a selected one is cleared. The selection is based on a predetermined priority ordering. Interruption code information is stored by the execution controls, indicating the source of the cleared request. The interruption handling program branches on the condition code and the interruption code information, to attend to the interruption task associated with the cleared request. Since that program is in control of the system when the TPI instruction is executed, the branch sequence may omit status saving operations and other operations associated with the handling of interruptions.

3 Claims, 4 Drawing Figures

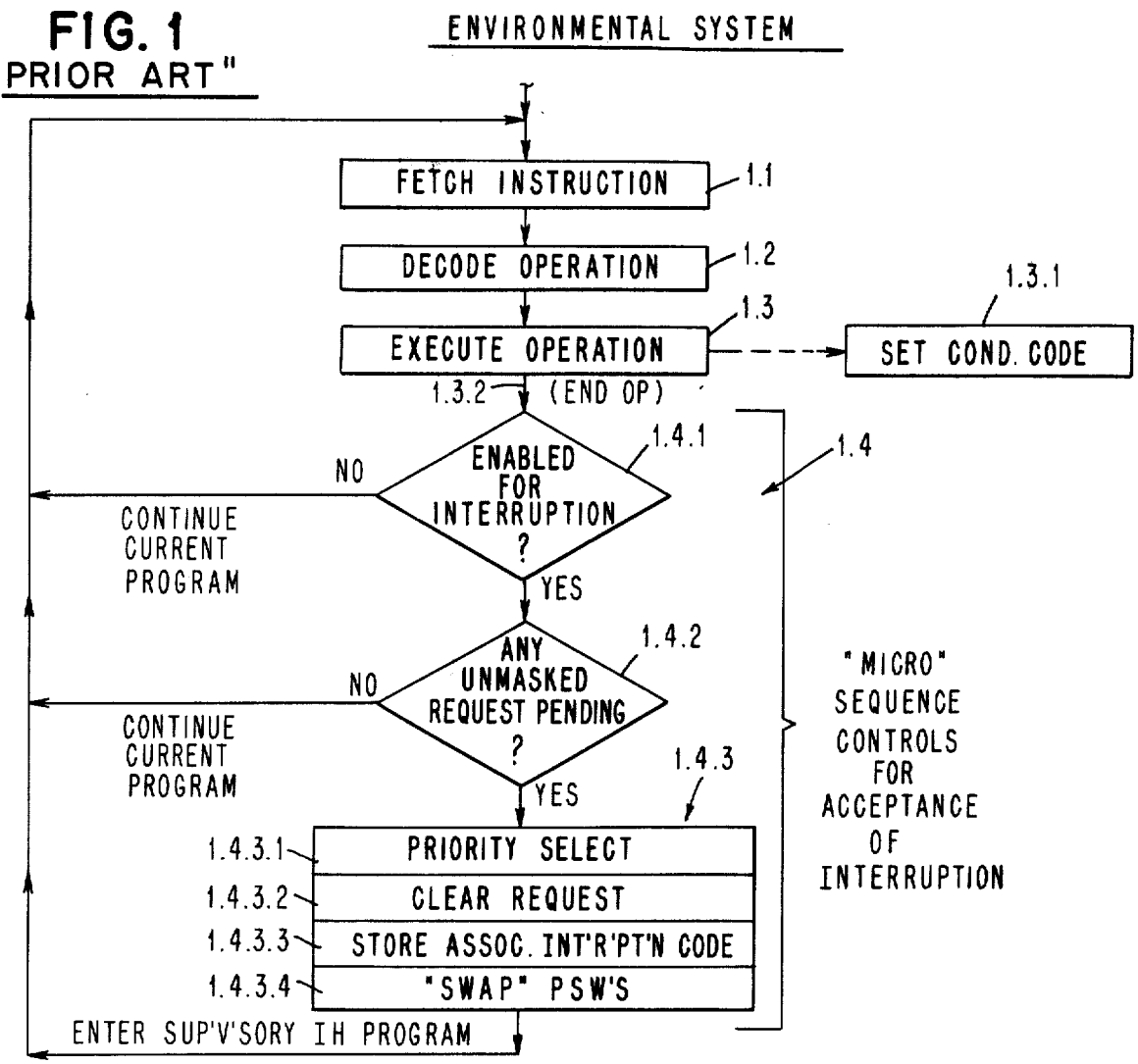
FIG. 1 "PRIOR ART"
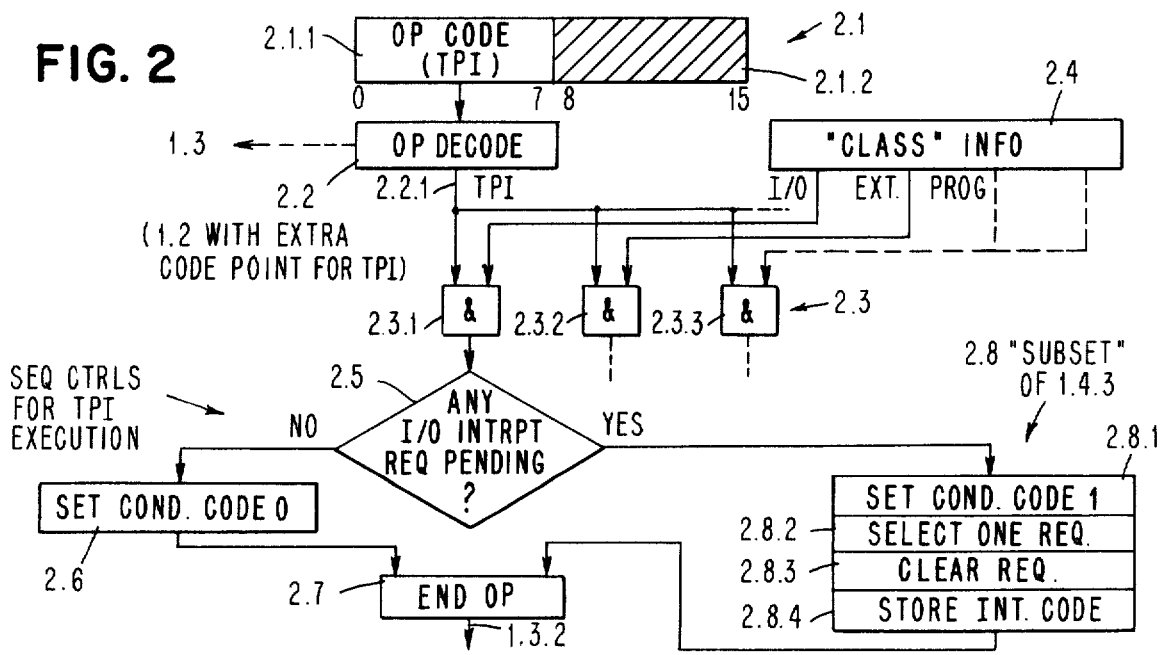
FIG. 2

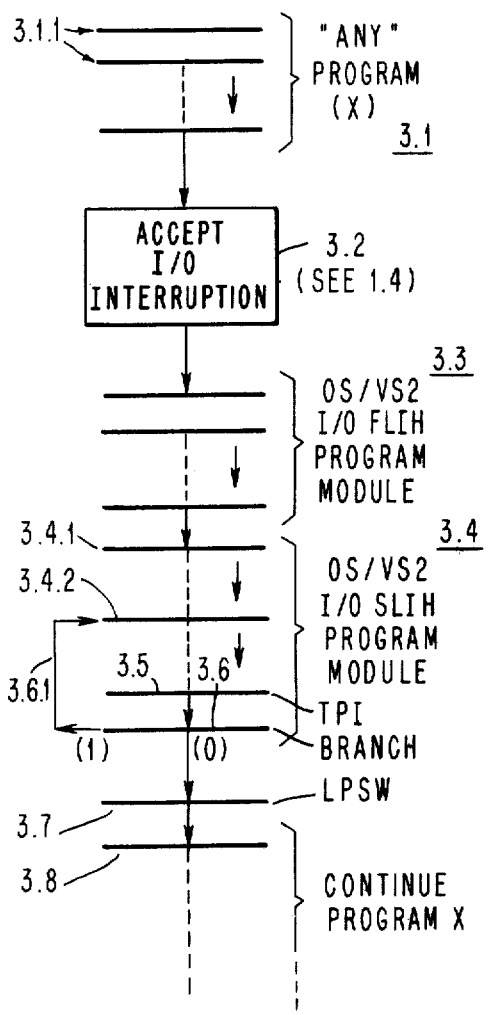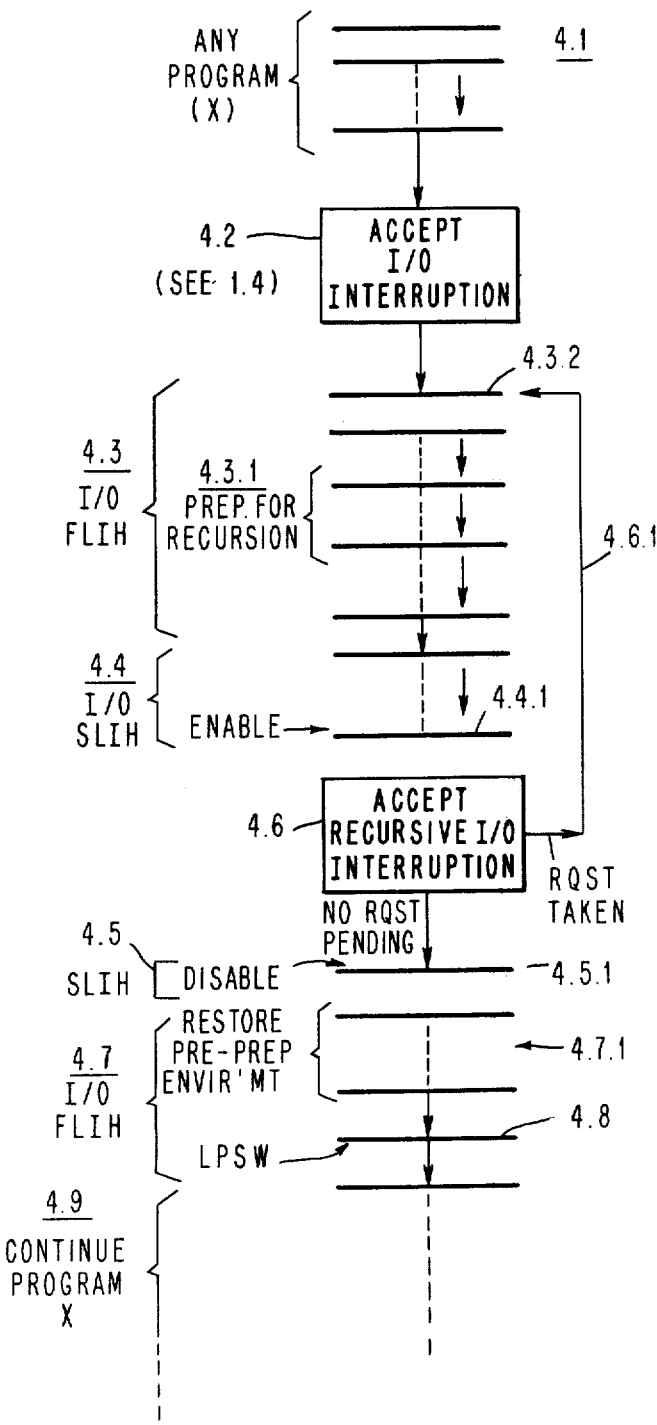

PROGRAM INSTRUCTION MECHANISM FOR SHORTENED RECURSIVE HANDLING OF INTERRUPTIONS

This is a continuation, of application Ser. No. 759,164 filed Jan. 13, 1977.

BACKGROUND OF THE INVENTION

In multi-program data processing systems, such as the IBM Systems/360 or 370, it is not unusual to have control pass in an oscillatory ("ping-pong") mode from an interrupting program to an interrupted program and immediately back to the same interrupting program (due to existence of pending requests for interruption in the same class as the interruption attended to by the interrupting program). This gives rise to "wasted motion" in system operation; especially in respect to operations associated with the exchange of status (and environmental) information.

Systems such as IBM Systems/360 and 370 have instructions for examining and conditionally clearing a specific interruption request (e.g. instructions such as TEST I/O and CLEAR I/O). However each such instruction is used only relative to one specific interruption request source associated with one specific class (I/O interruptions). In a system capable of serving many (e.g. hundreds of) relatively asynchronous I/O devices, and thereby subject to having many I/O interruption requests pending concurrently, it would be extremely inefficient and virtually unfeasible to use such "source-specific" instructions to attend to all (or a moderately large subset of all) pending I/O interruption requests and obviously impossible to use such instructions to attend to interruption requests not related to I/O functions. However we have found that there is at present a need which appears not to have been appreciated or recognized by others, although nonetheless important for effective operation, for having a capability to efficiently link the handling of non-specific interruptions in a given class (or subset of a class) on a program-controllable basis without having to displace environmental and/or program state information. This need is satisfied by the present invention.

SUMMARY OF THE INVENTION

In accordance with the foregoing discussion the invention provides a facility for smoothly linking the recursive handling of interruptions in one class to the handling of an original interruption in the same class; which facility is: a) not interruptible in its operation for the given class; b) operable only when the system is under control of a supervisory program; and c) operable effectively without any displacement or manipulation of program status information and/or other environmental information.

More specifically the invention provides a particular program instruction (TPI) which operates the system to: a) examine a set of multiple non-specific (i.e. not specified in this instruction) sources of requests for interruption in one specific class of interruptions; b) clear (terminate) one pending request, if at least one is pending; c) set a condition code indicating such clearance (or non-clearance); and d) store interruption code information accessible to the program currently in control of the system indentifying the source of a cleared request (when one is cleared).

The invention contemplates execution of the subject TPI instruction, while the associated interruption handling program which contains the instruction is in control of the processing system executing the instruction. It is also contemplated that the instruction may be executed while the system sequence controls for accepting interruptions are disabled relative to the associated class of interruptions. Execution of the TPI instruction has the effect of momentarily over-riding such disablement, and of permitting "instruction-controlled acceptance" of a non-specific interruption in the associated class; but it is characterized by the absence of any movement of status and/or environmental information associated with ordinary enablement and ordinary acceptance of interruption.

The invention further contemplates utilization of the subject TPI instruction at a stage of program execution at which all operations relative to servicing of a previously cleaned interruption in the associated class have been completed and at which the program is "preparing" to return control of the system to a previously interrupted program.

The invention contemplates further that as a consequence of instruction-controlled "acceptance" of interruption as characterized above, the interruption handling program currently in control of the system when the TPI instruction is executed (i.e. the program containing the instruction) is capable of attending directly to the "accepted" interruption request by a simple branch subroutine conditioned on the information stored as a result of the TPI execution; such subroutine being significantly shorter than the recursive program operations which would be required otherwise to attend to acceptance of an unscheduled interruption in the same class.

Furthermore, as a corollary, such controlled "acceptance" provides a basis for shortening existing programs for handling interruptions in one class successively in a recursive mode, and thereby for improving the utilization of system resources.

As another corollary such controlled acceptance and shortened program operation are expected to provide performance improvements which potentially could reduce the statistical frequency of over-runs in time-dependent processes and thereby potentially could reduce the amount of system processing time "wasted" on diagnostic, corrective and re-initiating procedures.

The foregoing and other features, aspects and objectives of the present invention may be more fully understood and appreciated by considering the following detailed description of the drawings and claims.

BRIEF DESCRIPTION OF THE DRAWINGS

In the drawings:

FIG. 1 illustrates the sequence of instruction execution and interruption acceptance operations in prior art environmental systems in which the subject invention may be advantageously applied and which are conveniently adaptable for such application;

FIG. 2 illustrates adaptation of such environmental systems in accordance with the subject invention;

FIG. 3 illustrates a typical application of the subject invention in an environmental system supervisory program for interruption handling; and FIG. 4 illustrates for comparative purposes "prior art" programming of such environmental systems for recursive handling of interruptions in a common class.

DETAILED DESCRIPTION

FIG. 1 illustrates the sequence of operations associated with execution of program instructions and acceptance of unscheduled interruption in "prior art" multi-programmed computing systems which represent environmental systems adaptable to utilize the subject invention advantageously; in particular, IBM System/360 and 370 systems.

Architectural principles of operation and organization relevant to the present invention are given in "IBM System/370 Principles of Operation", forms A22-6821 (System/360) and GA22-7000 (System/370).

Organizations of microprogram sequence controls in various models of such systems are described in U.S. Pat. Nos. 3,400,371 (Granted Sept. 3, 1968 to G. M. Amdahl et al) and 3,585,599 (Granted June 15, 1971 to D. C. Hitt et al); and in "Microprogram Control For System/360" by S. Tucker, IBM Systems Journal, Vol. 6, No. 4., pp 222-241.

Operating System (Supervisory) programs for performing interruption handling services relevant to the present description are given in: Forms GC28-5634 (Introduction of OS) and GC28-6535 (OS Concepts And Facilities) and SY26-3823 (OS/VS2 I/O Supervisor Logic) and SY28-0716 (OS/VS2 System Logic Library).

Relevant information in the foregoing references is incorporated herein by this reference.

FIG. 1 illustrates the sequence of execution of program instructions and unscheduled interruptions in the environmental systems. Program instructions are executed by actions of system sequence controls (e.g. microprogram controls) which serve to perform the actions of (1.1) fetching an instruction at a storage address usually designated by an instruction address count, (1.2) decoding the operation code portion of the instruction and (1.3) executing the operations designated or called for by the instruction. The execution action associated with certain instructions defined in the above architectural references includes the setting of a condition code as suggested at 1.3.1.

Between the terminal operation (END OP) of the execution of one instruction (position 1.3.2 in FIG. 1) and the fetching of the next instruction (position 1.1 in FIG. 1) the sequence controls of the system may be enabled to operate independent of the program currently in control to accept interruption (position 1.4, FIG. 1). The controls determine whether the system is enabled at this particular time (in its existing program state) for accepting interruptions (position 1.4.1). If the system is not enabled the next instruction is fetched (action 1.1). If the system is enabled the controls test for the existence of unmasked interruption requests (position 1.4.2, FIG. 1). If no unmasked interruption requests are pending the controls again pass directly to the fetching of the next instruction at 1.1. On the other hand, if at least one unmasked request for interruption is pending the controls perform the operations 1.4.3 associated with acceptance of interruption.

If more than one request is pending a priority selection is made of one request (operation 1.4.3.1, FIG. 1) and that request is cleared (1.4.3.2). If only one request is pending that request is cleared. Clearance of the request means that the indication manifesting the request is terminated. An interruption code associated with the selected request is stored (operation 1.4.3.3) and environmental information is exchanged (operation 1.4.3.4) to transfer control form the program associated with the last-executed instruction to a program for handling the interruption designated by the selected request. These operations are fully described in the foregoing architectural references and in above-referenced U.S. Pat. No. 3,400,371.

In this exchange a "new" PSW (program status word) associated with the interruption handling program is retrieved from storage and an "old" PSW associated with the interrupted program (i.e. the program containing the last executed instruction) is stored for future reference. The sequence controls then pass to the action 1.1 for fetching the first instruction of a supervisory program for interruption handling (IH).

The subject instruction (TPI) is intended to be used to initiate recursive action within interruption handling programs of such environmental systems. As shown in FIG. 2 the subject instruction (indicated at 2.1) contains an eight-bit operation code (OP Code) shown at 2.1.1 and an eight-bit field 2.1.2 which is either unused or may be used as described below to distinguish the class of interruption requests which may be "tested" by the instruction. The system sequence controls 2.2 for decoding instructions are provided with an extra decoding point 2.2.1 uniquely associated with the subject instruction. As indicated in FIG. 2 with the exception of line 2.2.1 (and the code recognition logic associated with said line) the controls 2.2 are essentially identical with the controls 1.2 of FIG. 1 and in response to OP Codes other than that at 2.1.1 provide outputs to the "normal" execution controls 1.3 of FIG. 1.

With the marking of TPI line 2.2.1 action is taken to determine the class of interruptions associated with the interruption handling program containing the TPI instruction which has just been decoded. The logic for making this determination is indicated schematically at 2.3 and 2.4 in FIG. 2. Class information distinguishing the class of interruption currently being handled (e.g. I/O interruption, external interruption, program interruption, etc.) may be used to enable corresponding AND circuits (2.3.1 for I/O interruption, 2.3.2 for external interruption, 2.3.3 for program interruption, etc.), one of which is thereby prepared to produce output excitation when line 2.2.1 is excited. The class information may be prepared in a register by the program. As an alternative the operation code 2.1.1 of the instruction may be used to distinguish class by having a different operation code for each class. Another alternative would be to use space 2.1.2 of the instruction to distinguish the class. Furthermore it should be obvious that if the TPI instruction were to be employed only relative to one class (e.g. I/O interruptions) then the foregoing class distinction would not be required and the logic indicated at 2.3 and 2.4 would not be required.

Taking the class of I/O interruptions as representative the action of execution of the associated TPI instruction proceeds as follows (after action 2.3.1). At 2.5 the execution sequence controls determine whether an interruption in the respective class (i.e I/O interruption class) is pending currently. Obviously this action is a subset of the action shown at 1.4.2 in FIG. 1 and may be adapted in the environmental system using a subset of the associated logic. If no active request is pending in the associated class the condition code is set to 0 as shown at 2.6 and the execution sequence terminates at 2.7 with the usual terminal operation of instruction execution (END OP); i.e. the point 1.3.2 in FIG. 1 at which the controls pass to the action 1.4 for general acceptance of unscheduled interruption in non-specific classes.

On the other hand if at test 2.5 an active interruption request is pending in the associated class the controls for executing the TPI instruction perform operations 2.8 consisting of the setting of the condition code to state 1 (2.8.1), selection of one active request in the specific class (I/O Interruption) according to a predetermined priority schedule (2.8.2), the clearance of the selected request (2.8.3) and the storage of the interruption code associated with the selected request (2.8.4). The actions of request selection, request clearance and interruption code storage constitute a subset of the actions shown at 1.4.3 in FIG. 1 (excluding the PSW exchange) and may be implemented by similar logic or by using the existing logic associated with actions 1.4.3 through re-entrant microprogramming.

Upon completing the actions 2.8 the controls pass via terminal operation 2.7/1.3.2 (END OP) to the conventional sequence 1.4 for conditional acceptance of interruptions in nonspecific classes.

The application of the subject instruction in a supervisory program for handling I/O interruption is indicated in FIG. 3. A comparative presentation of prior art recursive handling is presented in FIG. 4. An arbitrary program X (shown at 3.1 in FIG. 3 and 4.1 in FIG. 4) is presumed to be interrupted by acceptance of an I/O interruption request (at 3.2 in FIG. 3; 4.2 in FIG. 4) in accordance with actions 1.4 in FIG. 1. Individual program instruction actions are indicated schematically by horizontal lines; as shown for instance at 3.1.1.

In the initial stage of programmed interruption handling after acceptance (first level interruption handling or FLIH), indicated at 3.3 in FIG. 3 and 4.3 in FIG. 4, the supervisory program for interruption handling determines the cause of interruption and stores any additional environmental information which may be required relative to the further handling of said interruption. In an advanced stage of interruption handling (second level interruption handling or SLIH), shown at 3.4 in FIG. 3 and 4.4 in FIG. 4, the program performs actions required to service the interruption. In the case of I/O interruption such actions may involve for instance storage displacement of channel status word (CSW) information relative to a specific I/O channel.

Instruction 3.4.2 in the second level sequence 3.4 is executed initially later than the first instruction 3.4.1 in the same sequence and represents an initial point of recursive entry uniquely associated with the execution of a TPI instruction as described below. As indicated at 3.5 execution of TPI sets a condition code 0 or 1 as described previously. A branch instruction shown at 3.6 tests this code.

If condition code 0 is set the program is sequenced by the branch instruction to a Load PSW (LPSW) instruction shown at 3.7. This loads the "old" PSW into the system registers and effectively returns control of the system to the interrupted program (X); at the instruction 3.8 which would have been executed next if interruption had not been accepted at 3.2.

If condition code 1 is set by the TPI instruction branch instruction 3.6 branches the program as suggested at 3.6.1 into its recursive entry point 3.4.2. From this point the program 3.4 proceeds to perform only operations associated with the handling of the interruption request cleared by the TPI execution action as set forth previously. Since the TPI instruction and its associated branch instruction are located at a "final" position in the interruption handling program (just prior to the return of control to the interrupted program X), and since the TPI instruction invariably selects an interruption in the same class as the interruption just handled, it may be appreciated that there is no need to displace status or environmental information upon or in association with TPI execution. Furthermore since the TPI instruction is provided explicitly at such final position in the interruption handling program the program "knows" implicitly that all actions relative to the handling of the previous interruption have been completed and that the interruption request which must be serviced is identified by the currently stored interruption code (i.e. the code overwritten by TPI execution). Therefore a status exchange is not required and a minimal program routine may be used to complete the handling of the interruption "taken" by the action of TPI execution.

By way of contrast the first level interruption handling sequence at 4.3 in FIG. 4 includes a preparational subsequence shown at 4.3.1 which is not needed when TPI is used. The preparational sequence moves the program status information associated with program X temporarily to a backup storage position in anticipation of a further program status exchange described below and further conditions the program to be able to "skip" over unnecessary program steps during recursive interruption handling as described below.

In the second level interruption handling sequence 4.4, at a point 4.4.1 which is reached after all actions relative to the interruption accepted at 4.2 have been performed, the program contains an instruction for setting an enabling bit in the program status word which is currently in control of the system. This enables the system for recursive acceptance of interruption at 4.6 in the class (I/O) associated with the interruption accepted at 4.2. If no requests are pending in said class the program advances to instruction 4.5.1 in segment 4.5 of the second level program for interruption handling. Instruction 4.5.1 resets the enabling bit in the PSW to a disabling condition and the program proceeds at 4.7 to restore the environment which existed in the system prior to the preparational sequence 4.3.1. When this is accomplished the Load PSW instruction 4.8 is executed to return control to interrupted program X at 4.9.

If an I/O interruption request is accepted at 4.6 the PSW exchange 1.4.3.4 and other actions 1.4 of FIG. 1 are carried out at 4.6. The "new" PSW contains the address of instruction 4.3.2 entered via recursive entry path 4.6.1 at an initial stage of first level interruption handling program 4.3. By virtue of the preparation performed at 4.3.1 the interruption handling program proceeds to perform the requisite operations but skips many of the steps which are performed ordinarily during a first pass through the program from acceptance stage 4.2. Eventually the program returns to enablement stage 4.4.1 and, if no further interruptions are accepted at 4.6, to the disablement stage 4.5.1. The environmental restoration operations 4.7.1 place the program in the state prior to preparation operations 4.3.1 after which the interrupted program X is returned to control by Load PSW 4.8. Quite clearly considering FIGS. 3 and 4 comparatively it becomes evident that with the TPI instruction the program status exchange at 4.6 is avoided and the preparational actions 4.3.1 and restorative actions 4.7.1 may be eliminated thereby shortening the interruption handling program.

While the invention has been particularly shown and described with reference to preferred embodiments thereof, it will be understood by those skilled in the art that the above and other changes in form and details may be made therein without departing from the spirit and scope of the invention.

What is claimed is:

1. In a data processing system including program instruction retrieving and executing apparatus and system sequence controls having interruption request accepting means operating only between the termination of one instruction and the retrieving of the next instruction for conditionally performing interruption accepting operations (1.4) independent of said executing apparatus, each said accepting operation consisting of at least a first operation (1.4.3.2) to clear a selected active request, a second operation (part of 1.4.3.4) to store status information associated with an old program of instructions currently being performed, a third operation (part of 1.4.3.4) to store status information associated with a first level and subsequently a second level supervisory interruption handling program to be executed by said executing apparatus, the status information of the interruption handling program having means for disabling said accepting means from accepting a further interruption until the status is modified, and a fourth operation to begin the execution of the first level supervisory interruption handling program by said executing apparatus, wherein the improvement comprises apparatus (FIG. 2) associated exclusively with said executing apparatus for facilitating the recursive performance of said interruption handling program routine by said executing apparatus, comprising:
 means responsive to and operated only during execution of a predetermined instruction (TPI) by said executing apparatus in said second level supervisory interruption handling program, said instruction having means uniquely identifying said interruption class, including,
 means responsive to interruption requests for determining (2.3, 2.5) if any interruption requests of the same class are active;
 means responsive to a determination by said determining means that at least one interruption request of the same class is active for clearing (2.8.3) a selected one of said active requests; and means responsive to operation of said clearing means for storing an interruption code (2.8.4) associated with the selected request and setting a condition code for use by said executing apparatus to subsequently retrieve and execute a predetermined next instruction (branch on condition) in the second level interruption handling program currently being executed;
 said facilitating apparatus being susceptible of recursively accepting another interruption request while said accepting means is disabled.

2. Recursive apparatus in accordance with Claim 12 wherein the operations of said facilitating apparatus relative to any single one of said selected active requests are all performed in response to information contained in said predetermined instruction.

3. In a data processing system including program instruction retrieving and executing apparatus and system sequence controls having interruption request accepting means operating only between the termination of one instruction and the retrieving of the next instruction for conditionally performing interruption accepting operations (1.4) independent of said executing apparatus, each said accepting operation consisting of at least a first operation (1.4.3.2) to clear a selected active request, a second operation (part of 1.4.3.4) to store status information associated with an old program of instructions currently being performed, a third operation (part of 1.4.3.4) to store status information associated with a first level and subsequently a second level supervisory interruption handling program to be executed by said executing apparatus, the status information of the interruption handling program having means for disabling said accepting means from accepting a further interruption until the status is modified, and a fourth operation to begin the execution of the first level supervisory interruption handling program by said executing apparatus, wherein the improvement comprises a method for facilitating the recursive performance of said interruption handling program routine by said executing apparatus, comprising the following steps:
 retrieving and executing a predetermined instruction in said second level supervisory interruption handling program, said instruction having means uniquely indentifying said interruption class, said data processing system responsive to and operated only during execution of said predetermined instruction for further performing the following steps,
 determining if any interruption requests of said class are active;
 clearing a selected one of said active requests in response to a determination in said determining step that at least one interruption request of the same class is active,
 storing an interruption code associated with the selected request and setting a condition code for use by said executing apparatus to subsequently retrieve and execute a predetermined next instruction in said second level interruption handling program currently being executed,
 all while maintaining said accepting means disabled, and
 then retrieving and executing said next instruction.

* * * * *